United States Patent

Crins et al.

[11] Patent Number: 5,533,086
[45] Date of Patent: Jul. 2, 1996

[54] X-RAY EXAMINATION APPARATUS

[75] Inventors: Wilhelmus A. Crins; Wilhelmus M. J. A. Van Den Berk; Eric A. Von Reth; Hermanus P. M. Rijpert, all of Eindhoven, Netherlands

[73] Assignee: U.S. Philips Corporation, New York, N.Y.

[21] Appl. No.: 176,626

[22] Filed: Jan. 3, 1994

[30] Foreign Application Priority Data

Jan. 4, 1993 [EP] European Pat. Off. .............. 93200007

[51] Int. Cl.⁶ .................................................. H04N 1/00
[52] U.S. Cl. ...................................... 378/98.2; 378/98.7
[58] Field of Search ................................ 378/98.2, 98.7, 378/98.8, 98

[56] References Cited

U.S. PATENT DOCUMENTS

| 4,636,954 | 1/1987 | Komatsu . | |
|---|---|---|---|
| 4,700,299 | 10/1987 | Kimura et al. . | |
| 4,910,592 | 3/1990 | Shroy, Jr. et al. | 378/98.7 |
| 5,003,572 | 3/1991 | Meccariello et al. | 378/98.7 |
| 5,128,751 | 7/1992 | Ohara . | |

FOREIGN PATENT DOCUMENTS

| 0114369 | 8/1984 | European Pat. Off. | H04N 5/32 |
|---|---|---|---|
| 0128764 | 12/1984 | European Pat. Off. . | |
| 0381119 | 8/1990 | European Pat. Off. . | |
| 0562657 | 9/1993 | European Pat. Off. . | |

OTHER PUBLICATIONS

"Physical Image Quality Evaluation of a Digital Spot Fluorography System" A. R. Cowen et al, Phys. Med. Biol. 1992, vol. 37, No. 2, pp. 325–342.

*Primary Examiner*—David P. Porta
*Attorney, Agent, or Firm*—Jack D. Slobod

[57] ABSTRACT

An x-ray examination apparatus includes an imaging control for adjusting amplification of a primary video signal that is supplied by an image acquisition device, e.g., a television pick-up tube. By increasing the average video signal level, electronic noise is reduced. White-compression is performed so as to match the dynamic range of the amplified video signal to the range of an analog-to-digital converter for converting the amplified video signal to digital format. However, excessive white compression leads to deterioration of diagnostic quality. To avoid image artifacts associated with excessive white compression, both amplification of the primary video signal and white-compression are performed depending on the average signal level and the dynamic range of the primary video signal.

11 Claims, 1 Drawing Sheet

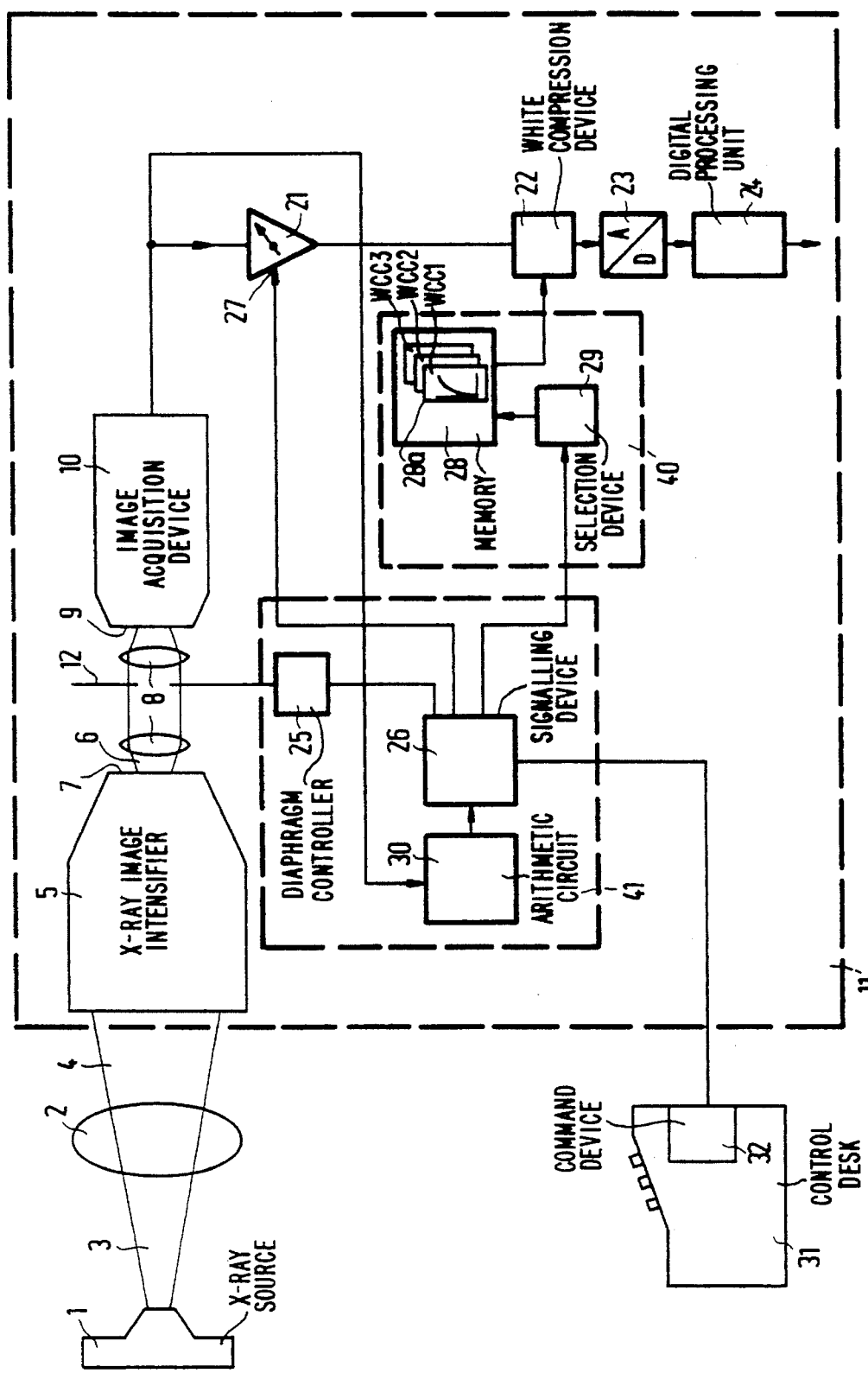

X-RAY EXAMINATION APPARATUS

BACKGROUND OF THE INVENTION

1. Field of the Invention

The invention pertains to an x-ray examination apparatus comprising an x-ray source for producing an x-ray image by irradiating an object, an imaging arrangement incorporating an x-ray image intensifier, an image acquisition device for acquiring an image produced on an output screen of the image intensifier and producing a primary video signal, and imaging control means for adjusting imaging parameters.

2. Description of the Related Art

An x-ray examination apparatus of said kind is described in the European patent application EP 0 114 369.

An x-ray examination apparatus as described in the cited reference comprises imaging control means comprising an arithmetic circuit and a diaphragm controller for optimising an adjustment of a diaphragm in front of a television camera tube in order to adapt a dynamic range of brightness-values of the x-ray image to the television camera. To that end a low-dose pre-irradiation is performed prior to x-ray exposure, and a maximum value of a video signal produced by the television camera tube during pre-irradiation is detected. From this maximum value a required diaphragm-value for x-ray exposure is computed by the arithmetic operation circuit, and by way of the diaphragm controller the diaphragm is adjusted such that a maximum output signal at the time of x-ray exposure equals a maximum value which the television camera can output. An x-ray image having a wide dynamic range and having important image information mainly in a lower part of the dynamic range will cause a problem when produced by the known x-ray examination apparatus. Namely, the important image information will be converted into video signals having small signal amplitudes thus having a low signal-to-noise ratio.

SUMMARY OF THE INVENTION

It is inter alia an object of the invention to provide an x-ray examination apparatus comprising an imaging arrangement for producing an amplified video signal having improved signal-to-noise ratio.

This is achieved in that an x-ray examination apparatus in accordance with the invention comprises a video amplifier for converting the primary video signal into an amplified video signal, said video amplifier having a control-input being coupled to the imaging control means for adjusting an amplification ratio of the video amplifier in dependence on an average value of signal amplitudes of the primary video signal.

A major contribution to a noise level of the amplified video signal is constituted by electronic noise that is produced by electronic components in the imaging arrangement, such as the image acquisition device and the video amplifier. The electronic noise level decreases, and consequently the signal-to-noise ration increases as the average signal amplitude of the amplified video signal increases. Thus the noise level of the amplified video signal is decreased toward the noise level associated with the shot noise of the x-ray photons by amplifying the primary video signal. The amplification rate is to be selected in dependence on the value of the average of the primary video signal in order to avoid saturation of the imaging arrangement.

A further preferred embodiment of an x-ray apparatus in accordance with the invention is characterised in that the imaging arrangement comprises white-compression adjustment means for adjusting white-compression in dependence on the primary video signal.

For further digital processing the amplified video signal having an analog format is converted into a digital format by an analog-to-digital converter. Known analog-to-digital converters have a fixed input range. In order to be able to match a dynamic range of the amplified video signal to the input range of the analog-to-digital converter white compression is performed on the amplified video signals supplied by the video amplifier so as to convert the dynamic range of the amplified video signal to the input range of the analog-to-digital converter. It is noted that it is known per se from Phys. Med. Biol. 37(1992)325–342 in the field of x-ray imaging to employ white compression for matching the dynamic range of the amplified video signal to the input range of the analog-to-digital converter. In that reference an imaging arrangement is described wherein a video amplifier having a fixed amplification ratio is employed. Because the dynamic range of the amplified video signal is dependent on the amplification rate applied to the primary video signal, white compression is to be adapted to the amplification rate in order to improve suppression of electronic noise of a digital video signal. Because white-compression inevitably compresses imaging information, increasing the amplification of the primary video signal should be carried out at an amplification rate which is sufficiently high for successful noise reduction, but is sufficiently low so that no excessive white-compression needs to be performed. Therefore, both adjustment of video amplification and white-compression are made in dependence of a on average brightness and dynamic range of the x-ray image acquired by the image acquisition device.

A further preferred embodiment of an x-ray examination apparatus in accordance with the invention is characterised in that the white-compression adjustment means comprises a memory device for storing a collection of white-compression curves and a selection device for selecting in dependence on the primary video signal a white-compression curve.

White-compression is carried out by employing a white-compression curve which is e.g., stored in a look-up-table. The white-compression curve defines a function which converts the dynamic range of the amplified video signal into signal amplitudes having a more narrow range. This is achieved in that especially higher signal amplitudes of the amplified video signal are more compressed. Adjusting white-compression thus amounts to adjusting an associated white-compression curve. To that end a collection of white-suppression curves is provided from which by way of the imaging control means an appropriate white-compression curve is selected for performing white-compression on an amplified video signal at issue.

A further preferred embodiment of an x-ray examination apparatus in accordance with the invention is characterised in that the x-ray examination apparatus comprises a designation means for supplying in dependence on the primary video signal a control signal to the selection device for controlling selection of a white-compression curve.

Selection of an adjustment of the video amplifier and of a white compression curve can be performed manually from a control desk. From a control desk a signal in correspondence with a imaging parameters is supplied to the imaging control means. The designation means comprises a command means coupled to the selection means and incorporated in a control desk from which an appropriate white compression curve and amplification ratio can be selected by activating the signalling device for controlling the selection device.

A further preferred embodiment of an x-ray examination apparatus in accordance with the invention is characterised in that the imaging arrangement comprises an arithmetic circuit for determining a dynamic range of a fluoroscopic x-ray image and calculating therefrom a dynamic range of an x-ray exposure image.

A dynamic range and average value of signal amplitudes of a primary video signal associated with an x-ray exposure image can be computed from a dynamic range of a primary video signal associated with an x-ray fluoroscopic image that is made prior to x-ray exposure. Thus selection of an appropriate white-compression is carried out by first determining the dynamic range and average signal amplitude for a fluoroscopic image and calculating a dynamic range and required video amplification rate for an x-ray exposure that is to follow fluoroscopy. On the basis of the required amplification rate and calculated dynamic range an appropriate white-compression curve is selected by the image-control.

A further preferred embodiment of an x-ray examination apparatus in accordance with the invention is characterised in that the imaging arrangement comprises an arithmetic circuit arranged for determining a dynamic range of a pre-irradiation x-ray image and calculating therefrom a dynamic range of an x-ray exposure image.

A dynamic range and average value of signal amplitudes of a primary video signal associated with an x-ray exposure image can be computed from a dynamic range of a primary video signal associated with a pre-irradiation x-ray image that is made prior to x-ray exposure. Thus selection of an appropriate white-compression is carried out by first determining the dynamic range and average signal amplitude for a pre-irradiation image and calculating a dynamic range and required video amplification rate for an x-ray exposure that is to follow fluoroscopy. On the basis of the required amplification rate and calculated dynamic range an appropriate white-compression curve is selected by the image-control means.

An imaging arrangement suitable for use in an x-ray examination apparatus in accordance with the invention preferably comprises a video amplifier for converting the primary video signal into an amplified video signal, said video amplifier having a control-input being coupled to the imaging control means for adjusting an amplification ratio of the video amplifier in dependence on an average value of signal amplitudes of the primary video signal.

An imaging arrangement suitable for use in an x-ray examination apparatus in accordance with the invention preferably also comprises white-compression adjustment means for adjusting white-compression in dependence on the primary video signal.

These and other aspects of the invention will become apparent from and elucidated with reference to the embodiments described hereinafter and with reference to the accompanying drawing.

BRIEF DESCRIPTION OF THE DRAWING

FIG. 1 shows a block diagram of an x-ray examination apparatus in accordance with the invention.

DETAILED DESCRIPTION OF THE PREFERRED EMBODIMENTS

FIG. 1 shows a block diagram of an x-ray examination apparatus in accordance with the invention. An x-ray source 1 is provided for irradiating an object 2, notably a patient, with an x-radiation beam 3. By absorption modulation within the object an image carrying x-ray beam 4 is formed. By means of an x-ray image intensifier 5 the image carrying x-radiation is detected and converted into image carrying visible radiation 6, i.e., radiation having a wavelength in the region of wavelengths between a wavelength of ultraviolet radiation and a wavelength of infrared radiation, Thus an x-ray image is converted into a corresponding visible image which is formed on an output screen 7 of the x-ray image intensifier. By means of an optical arrangement 8, the visible image is imaged on an image recording element 9 of an image acquisition device subsequently recorded by an image-acquisition-device 10, notably a video camera comprising a television pick-up tube or a semiconductor image sensor. Thus, by means of an imaging arrangement 11, an x-ray image is converted into a visible image which is turned into a primary video signal which is further processed into a video signal for an image having an improved diagnostic quality.

The television pick-up tube there generates a primary video signal having signal amplitudes in correspondence with brightness values of the image formed on the output screen of the image intensifier. The primary video signal is amplified by an adjustable amplifier 21. An amplified video signal is supplied to a white-compression-device 22 for transforming the dynamic range of the amplified video signal so as to obtain a compressed analog video signal having a dynamic range being adjusted to the input range of the an analog-to-digital converter 23 for forming a digital video signal which is supplied to a digital processing unit 24. Various electronic components such as the television camera 10 and the adjustable amplifier 21 add noise to the video signal. By increasing an average value of the signal amplitudes of the amplified video signal the signal-to-noise ratio is improved. However, the average value of the signal cannot be increased indefinitely without compromising a dynamic range of the amplified video signal and a dynamic range of the digital processing unit 24. A field-limiting diaphragm 12 is provided for controlling an intensity of the image carrying visible radiation incident on the image recording element 9. By way of a diaphragm controller 25 the opening of the diaphragm is controlled. The combination of adjusting the diaphragm 12 together with adjusting the video amplifier 21 provides for making available a range of amplification ratios for which the video amplifier 21 operates efficiently, while, although said range of amplification ratios may be limited, there is a comparatively wide range of values for which an average value of signal amplitudes of the amplified video signal can be obtained because the light intensity incident on the television camera can be controlled by way of the diaphragm.

The average signal amplitude of the amplified video signal is adjusted by adjusting the adjustable video amplifier 21 having an control input 27 which is connected to the signalling-device 26. In order to sustain matching of a dynamic range of the amplified video signal to the input range of the analog-to-digital-converter 23, there is provided a collection 28a of white-compression-curves, e.g., being stored in a memory 28, together with a selection-device 29. The signalling-device 26 supplies a control signal to a control input 27 of the video amplifier for adjusting the amplification ratio of the video amplifier. In addition a selection signal is supplied by the signalling-device 26 to the selection-device 29 for selecting a white-compression curve from the collection 28a, the selected white-compression curve being appropriate for matching the dynamic range of the amplified video signal to the input range of the analog-to-digital-converter 23. A white-compression-adjustment-device 40 is formed by the signalling-device 26 together with the memory 28 and the selection-device. Consequently, in dependence of the dynamic range of the primary video signal the average signal amplitude of the amplified video signal is set to such a level that the noise level of the amplified video signal is decreased towards the noise level pertaining to the shot noise due to the quantised nature of the x-radiation and by employing a suitable white compression curve, it is avoided that image artifacts are introduced when the amplified video signal is converted into a digital video signal.

The selection of a white compression curve can be performed manually from a control-desk 31. X-ray images have different dynamic ranges in various x-ray imaging applications such as e.g., vascular; surgical or urological examinations. Depending on a type of x-ray imaging circumstances, each of them giving rise to various known values of the dynamic range of the primary video signal, an operator of the x-ray apparatus can make a selection of a predetermined adjustment of the video amplifier and of an associated white-compression curve. To that end, there is incorporated in the control desk 31, a command-device 32 for supplying a control signal to the signalling-device 26 for activating said signalling-device 26 for supplying a relevant selection signal to the selection-device 29. A designation means for controlling selection of an appropriate white-compression curve is then formed by the command-means 32, together with the signalling-device 26 and the selection-device 29.

In addition there are provided various options for automatic selection of a white-compression curve. This has as a particular advantage that reducing electronic noise can be obtained for imaging circumstances for which an ensuing dynamic range and average video signal amplitude is less well-known. During fluoroscopy, preceding x-ray exposure, a dynamic range of a fluoroscopic image being acquired by the image acquisition-device 10 can be determined by supplying a fluoroscopic video signal to an arithmetic-circuit 30 for detecting a dynamic range of the fluoroscopic video signal and subsequently calculating a dynamic range of an x-ray image to be made by x-ray exposure. In the embodiment shown in FIG. 1, an imaging-control-means 41 is formed by the signalling-device 26 together with the diaphragm-controller and the arithmetic circuit 30.

As an alternative to obtaining a dynamic range of an x-ray image from fluoroscopy, pre-irradiation of the object the arithmetic circuit 30 is arranged for determining a dynamic range of an x-ray image acquired from said pre-irradiation and subsequently calculating a dynamic range of an x-ray image to be made by x-ray exposure.

We claim:

1. An x-ray examination apparatus comprising an x-ray source for producing an x-ray image by irradiating an object, an imaging arrangement incorporating an x-ray image intensifier, an image acquisition device for acquiring an image produced on an output screen of the image intensifier and producing a primary video signal, imaging control means for adjusting imaging parameters, a video amplifier for converting the primary video signal into an amplified video signal, said video amplifier having a control input being coupled to the imaging control means for adjusting an amplification ratio of the video amplifier in dependence on an average value of signal amplitudes of the primary video signal, an analog-to-digital converter having an input range and a white compression device for matching a dynamic range of the amplified video signal to the input range of the analog-to-digital converter, and white-compression adjustment means for adjusting the amount of white-compression produced by the white-compression device in dependence on the primary video signal.

2. An x-ray examination apparatus as claimed in claim 1, wherein the imaging arrangement comprises an arithmetic circuit arranged for determining a dynamic range of a pre-irradiation x-ray image and calculating therefrom a dynamic range of an x-ray exposure image.

3. An x-ray examination apparatus as claimed in claim 1, wherein said white-compression adjustment means comprises a memory device for storing a collection of white-compression curves and a selection device for selecting a white-compression curve from said collection in dependence on the primary video signal.

4. An x-ray examination apparatus as claimed in claim 3, wherein the x-ray examination apparatus comprises a signalling device for supplying in dependence on the primary video signal a control signal to the selection device for controlling the selection of a white-compression curve from said collection.

5. An x-ray examination apparatus as claimed in claim 4, wherein the imaging arrangement comprises an arithmetic circuit for determining a dynamic range of a fluoroscopic x-ray image and calculating therefrom a dynamic range of an x-ray exposure image.

6. An x-ray examination apparatus as claimed in claim 4, wherein the imaging arrangement comprises an arithmetic circuit arranged for determining a dynamic range of a pre-irradiation x-ray image and calculating therefrom a dynamic range of an x-ray exposure image.

7. An x-ray examination apparatus as claimed in claim 3, wherein the imaging arrangement comprises an arithmetic circuit for determining a dynamic range of a fluoroscopic x-ray image and calculating therefrom a dynamic range of an x-ray exposure image.

8. An x-ray examination apparatus as claimed in claim 3, wherein the imaging arrangement comprises an arithmetic circuit arranged for determining a dynamic range of a pre-irradiation x-ray image and calculating therefrom a dynamic range of an x-ray exposure image.

9. An x-ray examination apparatus as claimed in claim 1, wherein the imaging arrangement comprises an arithmetic circuit for determining a dynamic range of a fluoroscopic x-ray image and calculating therefrom a dynamic range of an x-ray exposure image.

10. An x-ray examination apparatus as claimed in claim 9, wherein the imaging arrangement comprises an arithmetic circuit arranged for determining a dynamic range of a pre-irradiation x-ray image and calculating therefrom a dynamic range of an x-ray exposure image.

11. An imaging arrangement suitable for use in an x-ray examination apparatus comprising a video amplifier for converting a primary video signal responsive to x-ray irradiation into an amplified video signal, said video amplifier having a control-input being coupled to the imaging control means for adjusting an amplification ratio of the video amplifier in dependence on an average value of signal amplitudes of the primary video signal and white-compression device intermediate the primary video signal and an analog-to-digital converter having an input dynamic range for matching a dynamic range of the amplified video signal to the input range of the analog-to-digital converter and means for adjusting the amount of white-compression produced by the white compression device in dependence on the primary video signal.

\* \* \* \* \*